United States Patent
Buehl et al.

(10) Patent No.: US 12,223,402 B2
(45) Date of Patent: *Feb. 11, 2025

(54) CLOUD BASED MACHINE LEARNING

(71) Applicant: Snap Inc., Santa Monica, CA (US)

(72) Inventors: Eric Buehl, Santa Monica, CA (US); Jordan Hurwitz, Marina del Rey, CA (US); Sergey Tulyakov, Marina del Rey, CA (US); Shubham Vij, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/741,614

(22) Filed: May 11, 2022

(65) Prior Publication Data

US 2022/0405637 A1    Dec. 22, 2022

Related U.S. Application Data

(63) Continuation of application No. 16/147,105, filed on Sep. 28, 2018, now Pat. No. 11,334,815.

(51) Int. Cl.
*H04L 67/10* (2022.01)
*G06F 9/445* (2018.01)
*G06N 20/00* (2019.01)

(52) U.S. Cl.
CPC ......... *G06N 20/00* (2019.01); *G06F 9/44505* (2013.01); *H04L 67/10* (2013.01)

(58) Field of Classification Search
CPC ...... G06F 9/44505; G06N 20/00; H04L 67/10
See application file for complete search history.

(56) References Cited

U.S. PATENT DOCUMENTS

| | | | |
|---|---|---|---|
| 7,971,156 B2 | 6/2011 | Albertson et al. |
| 7,996,793 B2 | 8/2011 | Latta et al. |
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |

(Continued)

FOREIGN PATENT DOCUMENTS

| | | |
|---|---|---|
| CN | 103049761 | 8/2016 |
| EP | 3707693 | 9/2020 |

(Continued)

OTHER PUBLICATIONS

Klinbua, Kitti, and Wiwat Vatanawood. "Translating tosca into docker-compose yaml file using antlr." 2017 8th IEEE International Conference on Software Engineering and Service Science (ICSESS). IEEE, 2017. (Year: 2017).*

(Continued)

*Primary Examiner* — Benjamin P Geib
(74) *Attorney, Agent, or Firm* — Schwegman Lundberg & Woessner, P.A.

(57) ABSTRACT

Disclosed are various embodiments for implementing computational tasks in a cloud environment in one or more operating system level virtualized containers. A parameter file can specify different parameters including hardware parameters, library parameters, user code parameters, and job parameters (e.g., sets of hyperparameters). The parameter file can be converted via a mapping and implemented in a cloud-based container platform.

20 Claims, 11 Drawing Sheets

(56) References Cited

U.S. PATENT DOCUMENTS

| | | |
|---|---|---|
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,334,815 B1 | 5/2022 | Buehl et al. |
| 11,531,402 B1 | 12/2022 | Stolzenberg |
| 11,546,505 B2 | 1/2023 | Canberk |
| 2009/0012788 A1 | 1/2009 | Gilbert et al. |
| 2011/0301934 A1 | 12/2011 | Tardif |
| 2014/0171036 A1 | 6/2014 | Simmons |
| 2015/0120293 A1 | 4/2015 | Wohlert et al. |
| 2015/0370320 A1 | 12/2015 | Connor |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0344910 A1 | 11/2017 | Wu |
| 2017/0351910 A1 | 12/2017 | Elwazer et al. |
| 2018/0158370 A1 | 6/2018 | Pryor |
| 2019/0155633 A1* | 5/2019 | Faulhaber, Jr. .......... G06N 5/04 |
| 2019/0279114 A1 | 9/2019 | Deshpande et al. |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |

FOREIGN PATENT DOCUMENTS

| | | |
|---|---|---|
| KR | 20220158824 A | 12/2022 |
| WO | 2016168591 | 10/2016 |
| WO | 2019094618 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"U.S. Appl. No. 16/147,105, Non Final Office Action mailed Jul. 30, 2021", 23 pgs.

"U.S. Appl. No. 16/147,105, Notice of Allowance mailed Jan. 12, 2022", 5 pgs.

"U.S. Appl. No. 16/147,105, Response filed Oct. 29, 2021 to Non Final Office Action mailed Jul. 30, 2021", 9 pgs.

Dartois, Jean-Emile, et al., "Investigating Machine Learning Algorithms for Modeling SSD I/O Performance for Container-based Virtualization", Journal of Latex Class Files, vol. 14, No. 8, (Aug. 2015), 14 pgs.

Sangpetch, Akkarit, et al., "Thoth: Automatic Resource Management with Machine Learning for Container-based Cloud Platform", Proceedings of the 7th International Conference on Cloud Computing and Services Science (CLOSER 2017), SCITEPRESS, (2017), 75-83.

* cited by examiner

CLOUD BASED MACHINE LEARNING

CROSS-REFERENCE TO RELATED APPLICATION

This application is a continuation of U.S. patent application Ser. No. 16/147,105, filed Sep. 28, 2018, which is incorporated by reference herein in its entirety.

TECHNICAL FIELD

The present disclosure generally relates to machines configured to the technical field of special-purpose machines that perform computer simulations and improvements to such variants, and to the technologies by which such special-purpose machines become improved compared to other special-purpose machines for machine learning in a networked environment.

BACKGROUND

Cloud computing has enabled end-user access to on-demand enterprise level computational power. However, setting up cloud computing tasks, e.g., specifying which resources will run which code, can be so time consuming that it frustrates the advantages of cloud computing.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
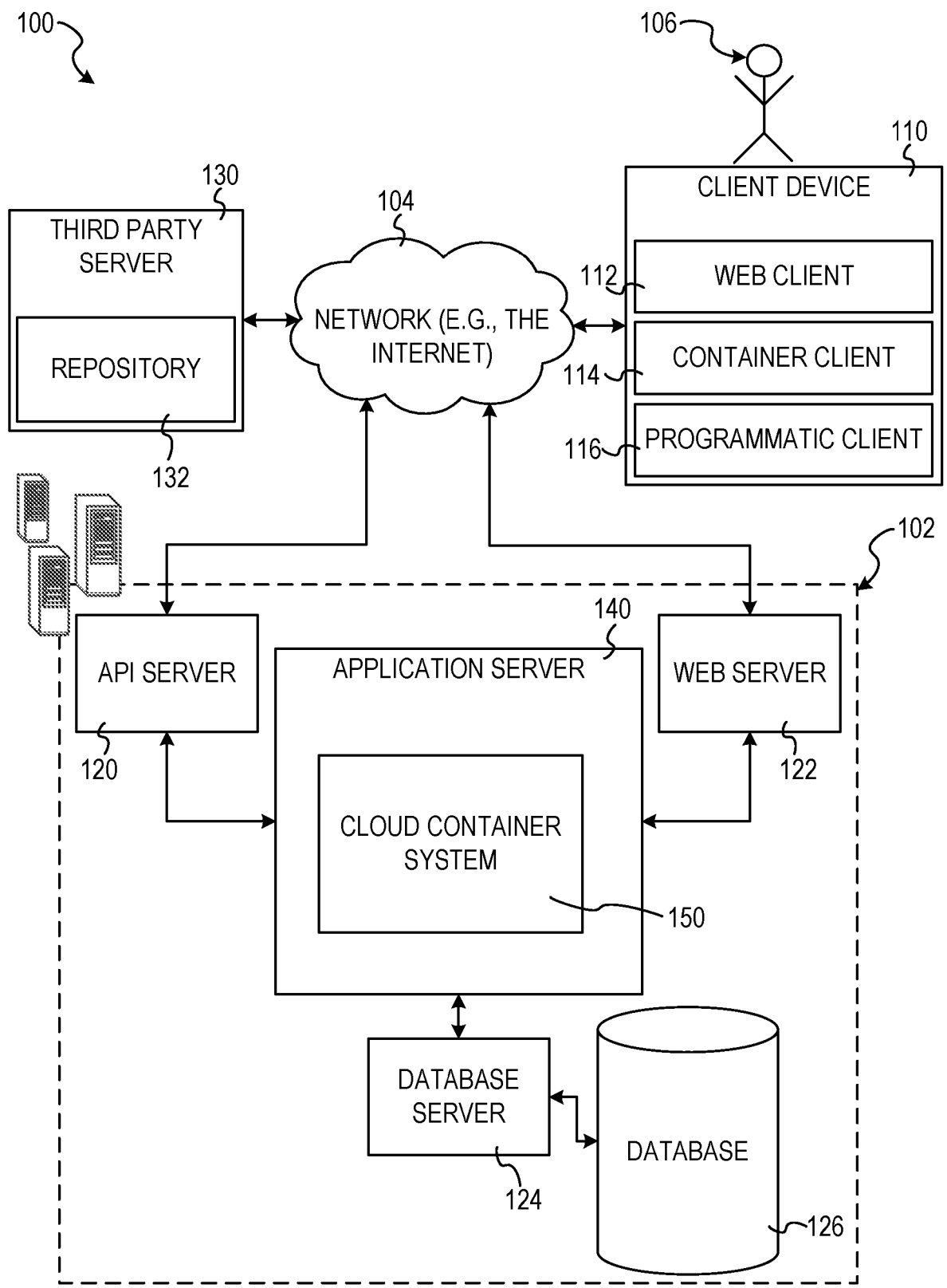
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details In general, well-known instruction instances, protocols, structures, and techniques are not necessarily shown in detail.

As mentioned, cloud computing gives end-users access to powerful computational resources, but setting up those resources can be difficult. One example computational task that can be time consuming and complex to set up is hyperparameter optimization of a machine learning model. Hyperparameters are machine learning parameters (e.g., neural network layers, ordering, size) that are specified before training, whereas parameters are those values (e.g., weights) learned via training. Which parameters will produce the best results (e.g., highest quality output, smallest run time) using a given machine learning scheme is not obvious and often computer scientists experiment with different configurations to see which works best. Trying different configurations of parameters can be very time consuming and computationally expensive. One approach for determining a good set of parameters is grid search, in which different sets are implemented in parallel. After a grid search is complete, a computer scientist can then determine which configuration works best. However, computational tasks such as grid search usually require complex interactions between hardware, libraries, and user code. Managing these interactions both before runtime and during runtime can be so time consuming and complex that performing these tasks in a cloud environment is prohibitively expensive.

To this end, a cloud container system 150 can be implemented to perform machine learning tasks in a cloud environment. The cloud container system 150 can be configured to receive a parameter file that specifies a computational task (e.g., a grid search) to be performed in a virtualization environment, such as Kubernetes®, operating within a cloud environment, such as Google Cloud®, or Amazon AWS®. The parameter file can specify hardware resources to be provisioned (e.g., quantity and type of Central Processing Units (CPUs), quantity and type of Graphics Processing Units (GPUs), memory amounts), code libraries (e.g., container images), user code that interacts with the code libraries, locations of the code and code libraries, operations commands (e.g., directory of code to be run, and execution command), and a plurality of jobs that run on worker nodes. The worker nodes can be actual or virtualized computers that run containers, which are operating system level virtualized environments having isolated namespaces (e.g., a Docker® container, which is a runtime environment of a Docker® image). The parameter file can specify different configuration for each job (e.g., a first worker node can be assigned to run a first set of hyperparameters, a second worker node can be assigned to run a second set of hyperparameters, and so on).

In some example embodiments, a user's client device has an SDK installed that interfaces with the cloud interface of the cloud container system 150. The user can author and upload a parameter file which, upon receipt, is converted into a native deployment file that the virtualization environment natively understands (e.g., a Kubernetes deployment file in YAML format (where YAML stands for: YAML Ain't Markup Language)). In some example embodiments, the cloud container system 150 converts the parameter file to the deployment file using a mapping or converter template, as discussed in further detail below.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications such as a container client 114, and a programmatic client 116 executing on the client device 110. The client device 110 includes the web client 112, a container client 114, and the programmatic client 116 alone, together, or in any suitable combination. Although FIG. 1 shows one client device 110, in other implementations, the network architecture 100 comprises multiple client devices 110.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, personal digital assistant (PDA), smart phone, tablet, ultra-book, netbook, laptop, desktop, multi-processor system, microprocessor-based or programmable consumer electronic, game consoles, set-top box, network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps.

The web client 112 accesses the various systems of the networked system 102 via the web interface supported by a web server 122. Similarly, the programmatic client 116 and container client 114 access the various services and functions provided by the networked system 102 (e.g., the cloud container system 150). As discussed in further detail below, in some example embodiments, the container client 114 is an application having an integrated software developers kit (SDK) that allows the client device 110 to interface directly with cloud container system 150.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, an application server 140. The application server 140 can host a cloud container system 150, which can provide content (e.g., items for three-dimensional simulation) to the client device 110, according to some example embodiments. The application server 140 is, in turn, shown to be coupled to a database server 124 that facilitates access to one or more information storage repositories, such as database 126. In an example embodiment, the database 126 comprises one or more storage devices that store information to be accessed by the cloud container system 150, such as user experimental code referenced by the parameter file. Additionally, a repository 132, executing on third party server 130, is shown as having programmatic access to the networked system 102 via the programmatic interface provided by the API server 120. For example, the repository 132 can store user code specified by the parameter file for programmatic retrieval, as discussed in further detail below.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 can also be implemented as standalone software programs, which do not necessarily have networking capabilities.

Figure 2:
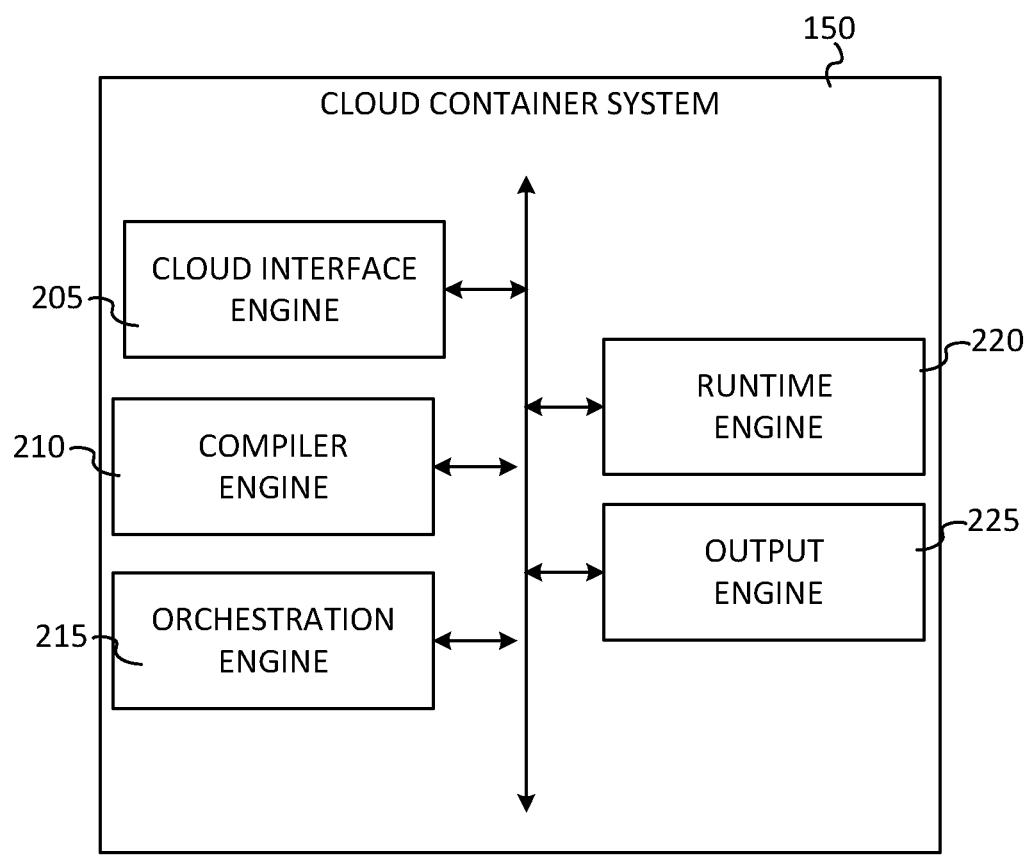
FIG. 2 shows example internal functional engines of a system, according to some example embodiments.

Attention is kindly directed to FIG. 2, which shows example internal functional engines of a system 150, according to some example embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the cloud container system 150 to facilitate additional functionality that is not specifically described herein.

As is understood by skilled artisans in the relevant computer arts, each functional component (e.g., engine) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the cloud container system 150 may be combined into a single module, or subdivided among multiple modules. It shall be appreciated that while the functional components (e.g., engines) of FIG. 2 are discussed in the singular sense, in other embodiments, multiple instances of one or more of the modules may be employed.

FIG. 2 illustrates example functional engines of a cloud container system 150, according to some example embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the cloud container system 150 to facilitate additional functionality that is not specifically described herein.

As is understood by skilled artisans in the relevant computer arts, each functional component (e.g., engine) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, any two or more modules of the cloud container system 150 may be combined into a single module, or subdivided among multiple modules. It shall be appreciated that while the functional components (e.g., engines) of FIG. 2 are discussed in the singular sense, in other embodiments, multiple instances of one or more of the modules may be employed.

In the example illustrated, the cloud container system 150 comprises a cloud interface engine 205, a compiler engine 210, an orchestration engine 215, a runtime engine 220, and an output engine 225. The cloud interface engine 205 is configured to receive a parameter file that specifies parameters for one or more jobs to run on a container platform (e.g., via orchestration engine 215 managing containers). In some example embodiments, the cloud interface engine 205 comprises a client-side module (an SDK integrated in a client application executing on a client device 110, such as container client 114) and a server-side module (e.g., an API) with which the client-side module interacts to execute jobs. In some example embodiments, the cloud interface engine 205 is configured to generate output data, e.g., generating a user interface dashboard with different metrics of requested jobs.

The compiler engine 210 is configured to translate the parameter file received by the cloud interface engine 205 into a configuration file comprising native commands that an orchestration platform is configured to understand. In some example embodiments, the compiler engine 210 is further configured to store user code by mounting a network drive (e.g., Network File System (NFS) drive) specified in the parameter file, or by copying the user code from a local machine (e.g., a machine executing the compiler engine 210), or by pulling the user code from a code repository 132 available over a network 104 (e.g., GitHub).

The orchestration engine 215 is configured to manage container execution environments. For example, the orchestration engine 215 can provision computational resources (e.g., provision computer processors, GPUs, and memory), instantiate one or more containers using the provisioned computational resources, and perform load balancing between the containers. For example, if a computer (e.g., worker node) upon which a given container is executing pre-maturely terminates (e.g., crashes), the orchestration engine 215 can move the jobs that were being run on computer to a different computer (e.g., different worker node), as discussed in further detail below.

The runtime engine 220 is configured to implement runtime execution environments to complete jobs specified in the parameter file. For example, the runtime engine 220 can implement one or more containers or pods (e.g., a group of one or more containers) that are managed by the orchestration engine 215 to implement jobs specified in the parameter file received by the cloud interface engine 205.

The output engine 225 manages storing output data generated by the runtime execution environment (e.g., logs and results generated by the containers). For example, the output engine 225 may store logs and results generated by the containers operating in the runtime engine 220 and use the logs or results to generate a user interface dashboard describing different metrics of the jobs run (e.g., results of different hyperparameter configurations in a grid search). Further, in some example embodiments, the output engine 225 is configured to transmit the output data over a network 104 to administrative users to report the status of jobs being implemented by the runtime engine 220.

Figure 3A:
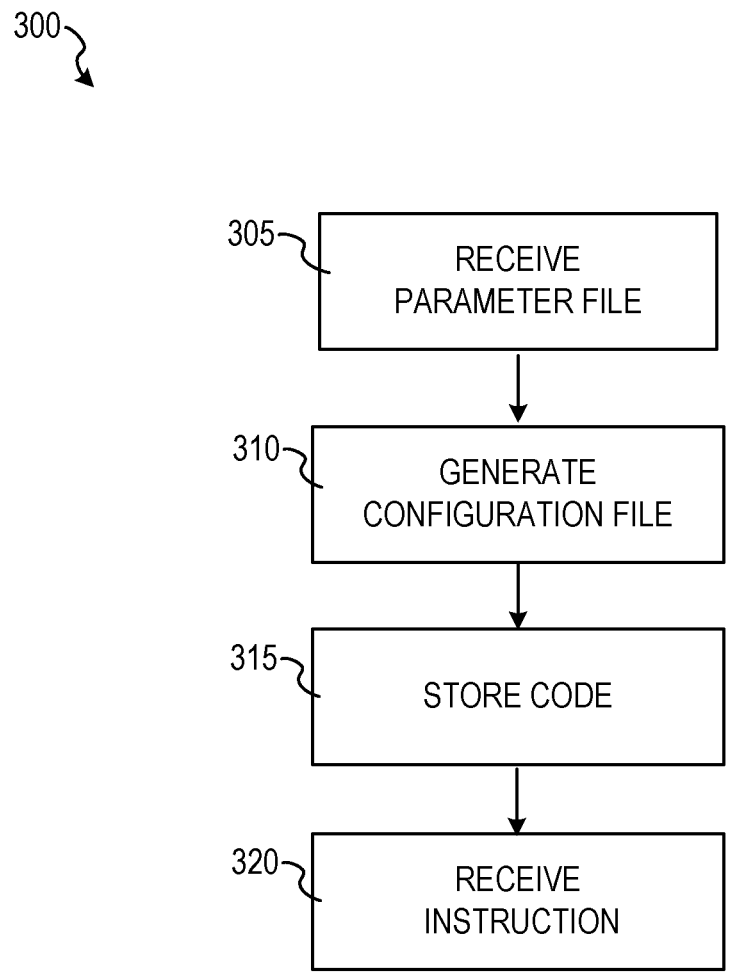
FIGS. 3A and 3B show flow diagrams of a method for implementing cloud container-based machine learning, according to some example embodiments.
Figure 3B:
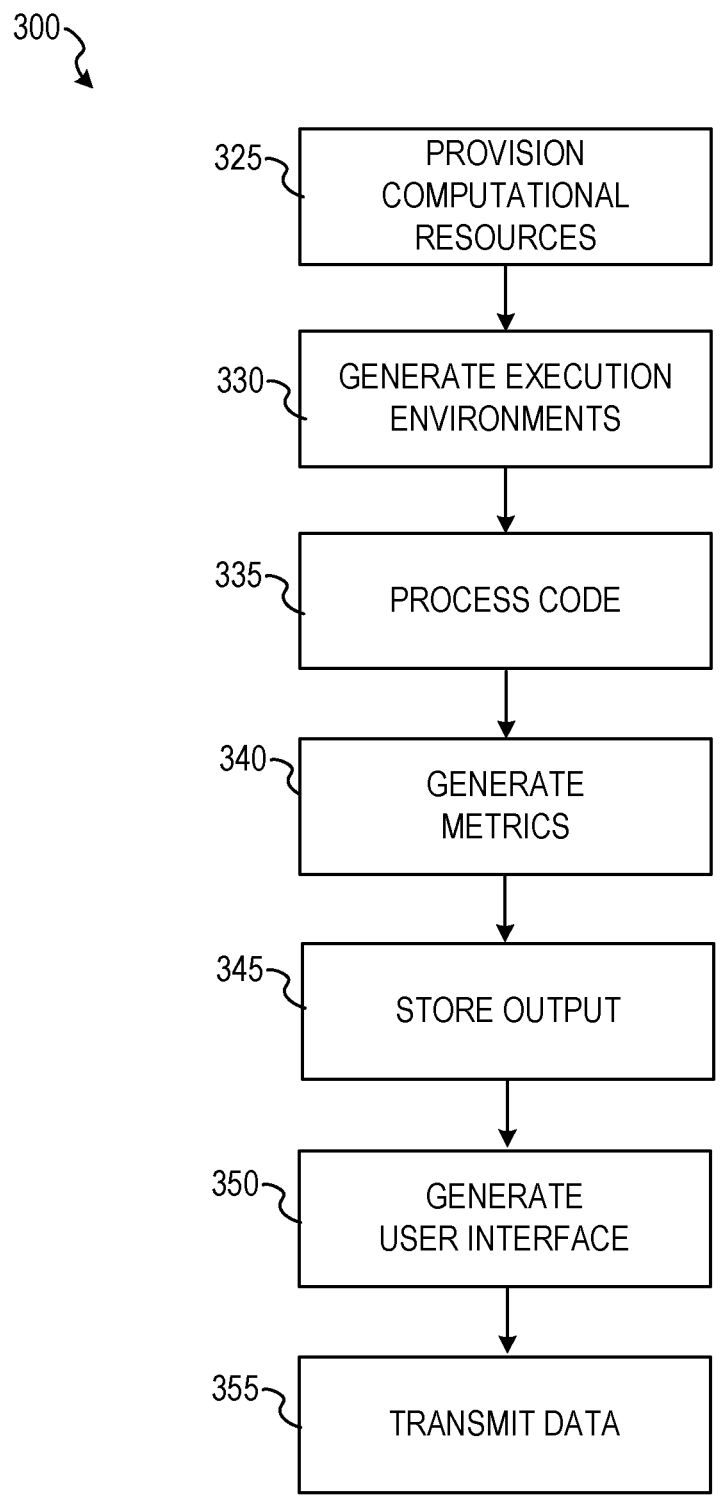

FIGS. 3A and 3B show flow diagrams of a method 300 for implementing cloud container-based machine learning, according to some example embodiments.

At operation 305, the cloud interface engine 205 receives the parameter file. The parameter file can specify container images, user code (e.g., a location of user code), and job parameters for different jobs. At operation 310, the compiler engine 210 generates a configuration file. In some example embodiments, the compiler engine 210 generates the configuration file from the parameter file using a template or mapping, as discussed in further detail below.

At operation 315, the compiler engine 210 stores user code specified in the received parameter file. For example, if the parameter file specifies a NFS directory, the compiler engine 210 provides the code in the NFS directory to the orchestration engine 215 and runtime engine 220 (e.g., mounts the NFS directory and transfers the user code, or exposes the mounted directory to the runtime environment).

At operation 320, the cloud interface engine 205 receives an instruction. For example, the cloud interface engine 205 receives an instruction to run the deployment as specified in the parameter file. Example instructions include:

rutils cluster select <cluster_name>[--zone=<str>]
    rutils cluster run [options][--y|-yes]<config>
    rutils cluster delete [--y|-yes]<config>
    rutils cluster dashboard [--port=<port_number>]
    rutils cluster list-jobs Turning to FIG. 3B, at operation 325, the orchestration engine 215 provisions computational resources. For example, the orchestration engine 215 allocates a set of several CPUs, a GPU, and memory units for each job specified in the parameter file.

At operation 330, the orchestration engine 215 generates execution environments to perform one or more jobs specified by the received parameter file. For example, the orchestration engine 215 initiates one or more worker nodes that manage pods of containers.

At operation 335, the runtime engine 220 instantiates execution environments to process the jobs using the user code and the parameters specified in the parameter file. For example, at operation 335, each of the worker nodes processes the jobs using the specified container images, user code, and job parameters. While operation 335 is being performed, the orchestration engine 215 may perform load balancing between worker nodes (e.g., move jobs between worker nodes if a node crashes).

At operation 340, the runtime engine 220 generates metrics data that describes completion times, job status, and error codes. Example job data includes:

=>Validation Accuracy did not improve
[Epoch 0/0] [Batch 40/99][D loss: 0.397438 (0.009694)] [G loss: 41.031708 (1.000773)] [Heatmap loss: 41.031708 (1.000773)] [BCE loss: 1.039510 (0.025354)] [NMSE: 0.305638]=>Saving a new best
[Epoch 0/0] [Batch 41/99] [D loss: 0.669522 (0.025404)] [G loss: 27.326008 (1.627565)] [Heatmap loss: 27.326008 (1.627565)] [BCE loss: 0.804315 (0.043901)] [NMSE: 0.230175]=>Validation Accuracy did not improve
[Epoch 0/0] [Batch 42/99] [D loss: 0.495664 (0.036340)] [G loss: 27.917980 (2.238970)] [Heatmap loss: 27.917980 (2.238970)] [BCE loss: 1.088859 (0.068202)] [NMSE: 0.246252]

At operation 345, the runtime engine 220 stores output data generated by the instantiated execution environments. For example, in some embodiments, the tasks performed by the containers may be generative tasks that receive an input image and generate an output image. In those example embodiments, at operation 340, metrics data is generated describing how long various tasks took to complete, while at operation 345 the actual output image is stored. It is appreciated that operation 345 may be optional and skipped if the jobs specified by the parameter file do not generate output data. Further, in some example embodiments, operation 340 does not precede operation 345 but rather both are performed simultaneously or in parallel (e.g., by different services running on different threads, etc.).

At operation 350, the output engine 225 generates a user interface displaying operational data, such as the stored execution environment data of operation 340 and visualizations of the execution environment data. At operation 355, the output engine 225 transmits notification information to one or more client devices 110. For example, at operation 355, the output engine 225 transmits a link to the user interface generated at operation 350 and or log data stored at operation 340.

Figure 4:
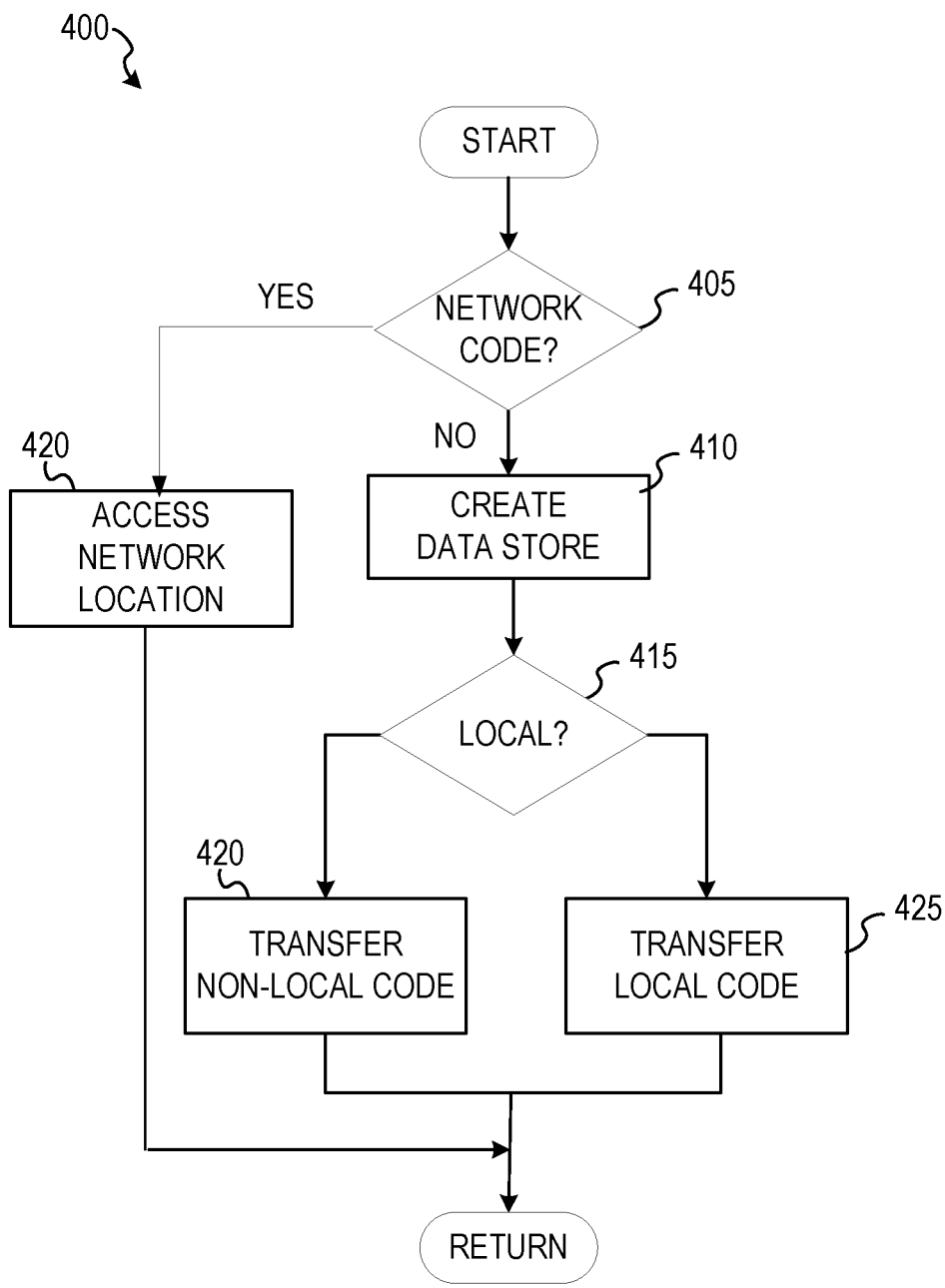
FIG. 4 shows a flow diagram of a method for accessing code specified in the received parameter file.

FIG. 4 shows a flow diagram of a method 400 for accessing code specified in the received parameter file. In some example embodiments, the method 400 is implemented as a subroutine of operation 320 (FIG. 3A) in which user code specified in the parameter file is made available to the execution environments.

At operation 405, the compiler engine 210 determines whether the code specified in the received parameter file is network accessible code. For example, if the parameter file specifies a network file storage address, the compiler engine 210 determines, at operation 405, that the specified code is network accessible the method 400 continues to operation 420. At operation 420, the runtime engine 220 mounts the network accessible code (e.g., mounts a specified NFS) to provide the code to the execution environments (e.g., containers).

Alternatively, if, at operation 405, the compiler engine 210 determines that the network code specifying the parameter file is not network accessible code, the method 400 continues to operation 410, in which the compiler engine 210 generates a cloud data storage location (e.g., a directory) to store user code transferred in operations 420 and 425. In some example embodiments, the data store created at operation 410 occurs at other points in method 400 (e.g., between operations 415 at operation 420, between operations 415 and 425).

At operation 415, the compiler engine 210 determines whether the code specified in the parameter file is located on a local file system (e.g., local memory, local hard drive, etc., of the computer that uploaded the parameter file). If the user code is located on a local file system, the method continues to operation 425, in which the compiler engine 210 transfers the locally stored code to the data storage location created at operation 410. Alternatively, if the code specify the parameter file is not locally stored, then the method 400 proceeds from operation 415 to operation 420, in which the compiler engine 210 transfers nonlocal code to the group data storage location created at 410. For example, if the parameter file specifies that the network code is located on a non-local code repository 132 (e.g., Github), the compiler engine 210 programmatically accesses the non-local code repository 132 and transfers the code from the repository 132 to the data store created at operation 410.

Figure 5:
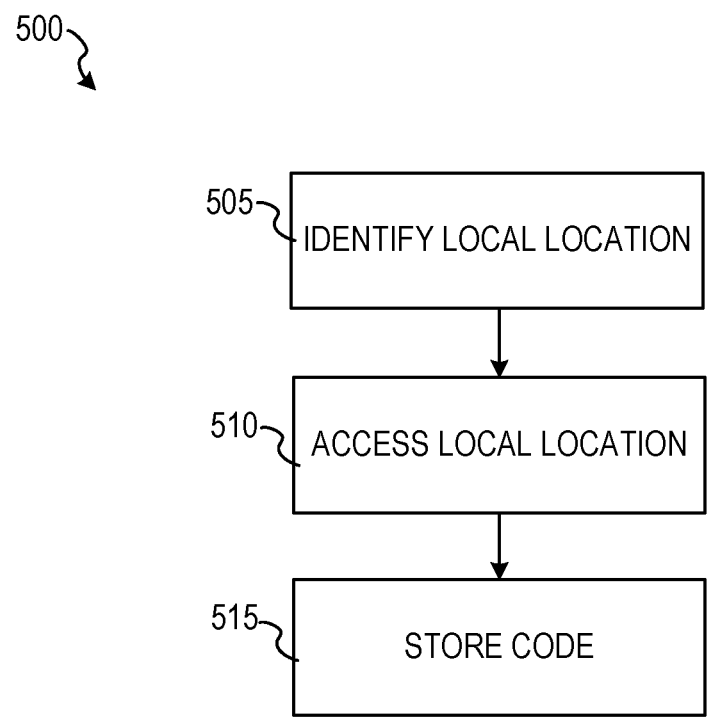
FIG. 5 shows a flow diagram of a method for storing user code, according to some example embodiments.

FIG. 5 shows a flow diagram of a method 500 for storing user code, according to some example embodiments. In some example embodiments, the method 500 is implemented as a subroutine it executes in operation 425 (FIG. 4). At operation 505, the compiler engine 210 identifies a local location of user code. The local location can be specified as a local drive or directory on a drive that stores the user code. At operation 510, the compiler engine 210 accesses the local location storing the code. At operation 515, the compiler engine 210 transfers the user code from the local location to the network storage location.

Figure 6:
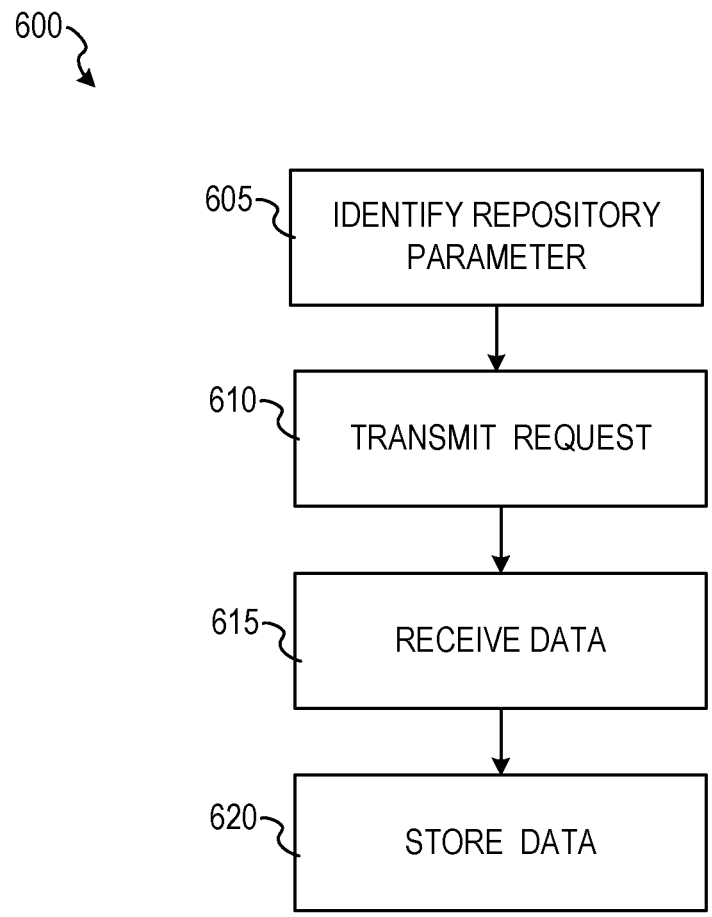
FIG. 6 shows a flow diagram of a method for accessing and storing repository code, according to some example embodiments.

FIG. 6 shows a flow diagram of a method 600 for accessing and storing repository code, according to some example embodiments. The method 600 is implemented as a subroutine that is implemented within operation 420 (FIG. 4), according to some example embodiments. At operation 605, the compiler engine 210 identifies a repository parameter. For example, at operation 605, the repository parameter can be an address of an API of a network service that stores code (e.g., GitHub). For example:

```
'''yaml
repository:
    repo: <repo_url>
    access: <username, password, token data>
    source_folder: <folder_where_your_sources_are_located>
    target_folder: <directed created at operation 410, e.g., a NFS location>
'''
```

At operation 610, the compiler engine 210 transmits a request to a repository API requesting the user code. In some example embodiments, the request transmitted operation 610 is structured by the compiler engine 210 to be understood by the API specified in the repository parameter of operation 605. The request may include user account to data, user password data, and additional data (e.g., a token) necessary to access the user code on the repository 132. At operation 615, the compiler engine 210 receives the network code from the network repository. At operation 620, the compiler engine 210 stores the received decoded storage location generated at operation 410 (FIG. 4).

Figure 7:
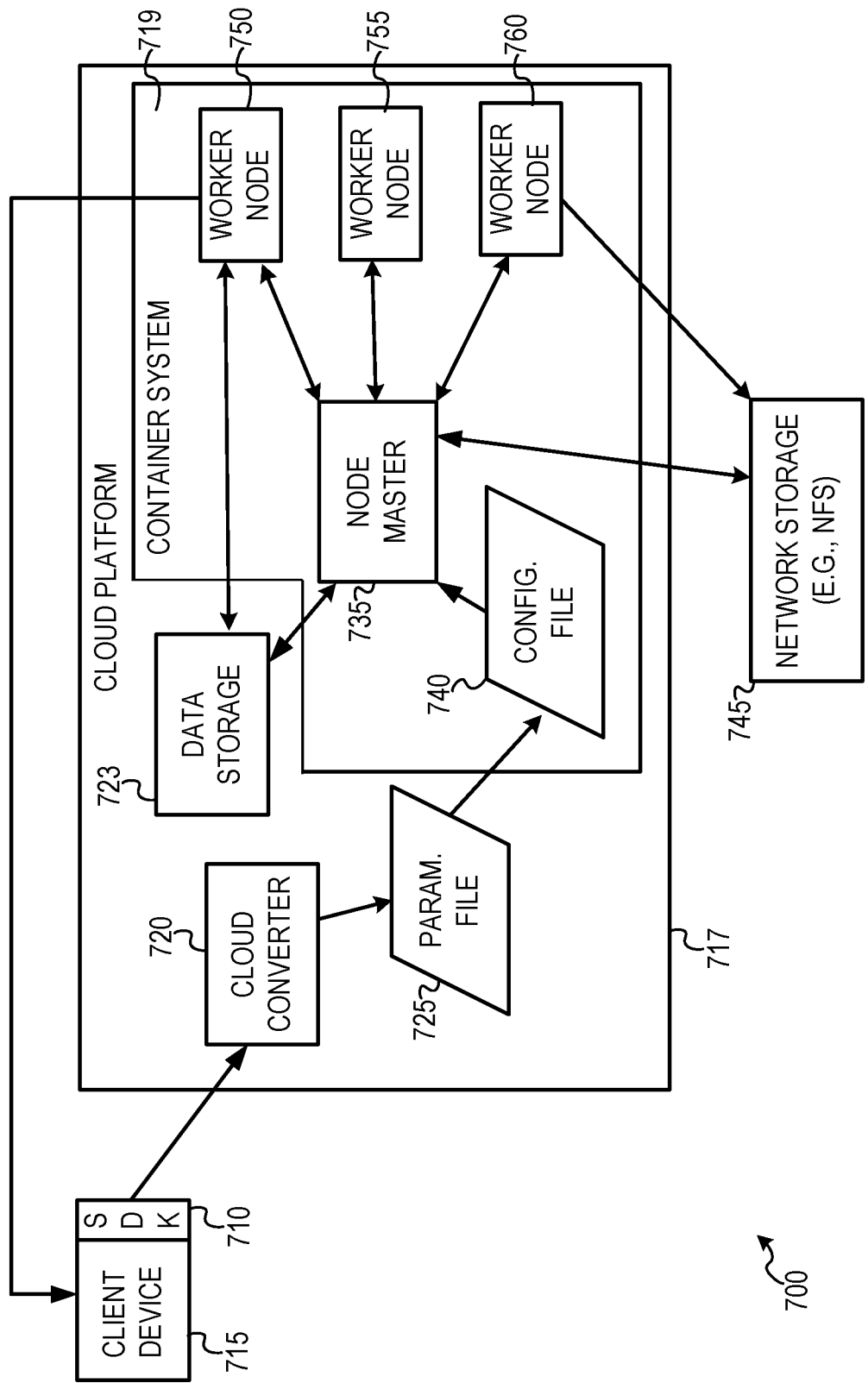
FIG. 7 shows an example network architecture for implementing cloud container-based machine learning, according to some example embodiments.

FIG. 7 shows an example network architecture 700 for implementing cloud container-based machine learning, according to some example embodiments. In FIG. 7, a client device 715 interacts with a cloud platform 717 (e.g., Amazon A3, Google Cloud). The cloud platform 717 can further host a container system 719 (e.g., Kubernetes) that manages a plurality of containers that run on worker nodes (e.g., Kubernetes nodes), such as worker node 750, worker node 755, and worker node 760. The worker nodes are managed by a node master 735 (e.g., Kubernetes Master Node). Running the container system 719 from the cloud platform 717 allows computational resources (e.g. processors, GPUs, memory) to be rapidly provisioned according to the intensity or scale of jobs being performed by the container system 719. Also, the container system 719 is able to ensure distributed processing of one or more jobs or computational tasks issued to the container system 719. For example, if worker node 755 crashes or is otherwise unresponsive, the node master 735 may identify which jobs (e.g., Kubernetes pods, pod replicates) were running on the downed node (i.e., worker node 755) and redistribute those jobs to other functioning nodes (e.g., worker node 750 and/or worker node 760).

Which tasks are run and which hardware is provisioned can be specified in the configuration file 740 (e.g., a deployment yaml) in a format that the container system 719 is natively configured to understand (e.g., if the container system 719 is a Kubernetes platform, the configuration file 740 can be a Kubernetes deployment file in a format specified by Kubernetes).

In some example embodiments, the client device 715 initiates a cloud container-based machine learning task by using an SDK 710 (e.g., an SDK of the cloud platform 717) to transmit a parameter file 725 to the cloud converter 720 (an API of the cloud platform 717).

An example parameter file 725 with parameters specified is included below. Comments are denoted using two forward slashes.

```
::::BEGIN CODE::::
"'yaml
//gcr docker or container image id
docker_image: gcr.io/research-proto/anacon-pytorch
///specifies user code, e.g., nfs storing machine learning scheme type
such as neural network style transfer
nfs: nn_style-transfer-nfs-vm
//hardware
gpu_type: "nvidia-tesla-p100"
gpu_num: "1"
cpu_num: "6"
memory: "16"
//specifies code for UIs
tensorboard: "/nfs/<folder_with_code>"
script:
//specifies entry point
  pre_run_event: "cd /nfs/<folder_with_code>"
//execution or run command
command: "python <file_name>.py"
//different jobs to be performed, e.g., a hyperparameter grid search in
which each job has differently configured params.
    jobs:
      - name: <job_1_name>
        args:
          <param_name_1>: <value>
          <param_name_2>: <value>
      - name: <job_2_name>
        args:
          <param_name_1>: <value>
          <param_name_2>: <value>
          <param_name_3>: <value>
            custom: "<custom_parameters>" //custom param that user
            code
at the nfs addressed specified above is configured to understand
     ...
"'
::::END CODE::::
```

The parameter file 725 allows an end-user (e.g., computer scientist) to specify hardware, images, user/experimental code, and differently configured jobs in an individual interface that removes the complex interdependencies. For example, the jobs can be authored in a single interface, with custom parameters that the container system 719 cannot understand but that the network storage 745 has been customized (e.g., by the user 106) to understand. In this way, the user 106 can specify hardware, background/library code, custom user code and custom parameter sets (and individual custom parameters) for different jobs in a single interface.

The SDK 710 can be installed on the client device 110 and accessed via terminal to issue commands (e.g., specification of a yaml file, task run instructions, etc.). In some example embodiments, the SDK 710 is integrated into an application that runs on top of an operating system (e.g., container client 114 and/or programmatic client 116 in FIG. 1).

The cloud converter 720 converts the parameter file 725 into a configuration file 740 using a mapping template. An example mapping template is included below.

```
::::BEGIN CODE::::
template = {
  "apiVersion": "batch/v1",
  "kind": "Job",
  "metadata": {
    "name": name
  },
  "spec": {
    "backoffLimit": 0,
    "template": {
      "metadata": {
        "labels": {
          "app": "{ }-app".format(name),
          "user": "{ }".format(user)
        }
      },
      "spec": {
        "nodeSelector": {
          "cloud.google.com/gke-accelerator": gpu_type
        },
"restartPolicy":
"Never",
"volumes": [
  {
    "name": "dshm",
    "emptyDir": {
      "medium": "Memory"
    }
  },
  {
    "name": "nfs",
    "persistentVolumeClaim": {
      "claimName": "{0}".format(nfs)
    }
  },
],
"containers": [{
  "name":
  "{ }-container".format(name),
    "image":
      docker_image,
      "command": ["/bin/bash", "-c"],
      "args": [
        "set -o pipefail && {command} 2>&1 | tee -a
{log_dir}/{name}.log".format(
log_dir=log_dir, command=command, name=name)
      ],
    "resources": {
      "requests": {
        "memory": "{ }Gi".format(memory),
        "cpu": cpu_num
      },
      "limits": {
        "nvidia.com/gpu": gpu_num
      }
    },
    "volumeMounts": [{
      "name": "nfs",
      "mountPath": "/nfs"
    }, {
      "name": "dshm",
      "mountPath": "/dev/shm"
    }]
  }],
  }
 }
}
::::END CODE::::
```

In some example embodiments, the parameter file 725 specifies user code to be retrieved and stored on the cloud platform 717 or in the container system 719. For example, the parameter file 725 may specify a network storage 745 which can be mounted by the node master 735 and or the worker nodes 750, 755, 760. Upon execution of the configuration file 740, the node master 735 or worker nodes 750 through 760 may access the user code located on the network storage 745 at in insertion point specified by the configuration file 740. In some example embodiments, a data storage location is created on the cloud platform 717 as discussed with reference to FIG. 4 above (operation 410). In those example embodiments, when the parameter file 725 is received, the cloud converter 720 transfers user code stored on the client device 715 to the data storage location 723 for access by the container system 719 (operation 425). Further, in some example embodiments, the cloud converter 720 is configured to access the repository 132 to transfer user code stored in the repository 132 to the data storage location 723.

Figure 8:
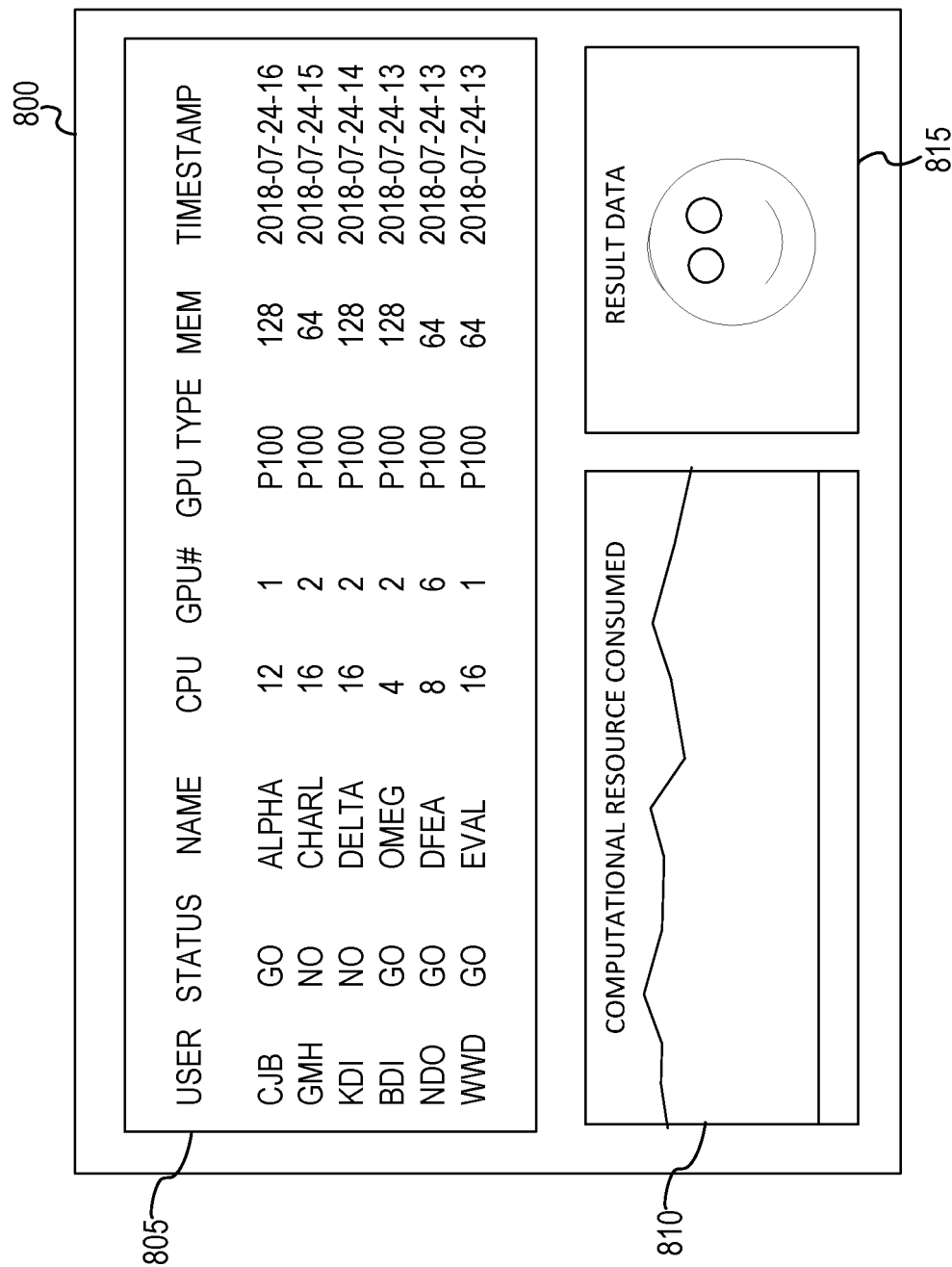
FIG. 8 shows an example user interface for displaying execution environment data, according to some example embodiments.

FIG. 8 shows an example user interface 800 for displaying execution environment data, according to some example embodiments. As illustrated, the user interface 800 can be generated as a dashboard that has multiple windows, including a first window 805, a second window 810, and a third window 815. The first window 805 displays different metrics of different deployments (e.g., where a deployment corresponds to a parameter file 725 that specifies one or more jobs). The second window 810 is a visualization user interface which can display metrics data of the different deployments, jobs, or resources consumed. The third window 815 can display output data generated by the jobs run in the different deployments (e.g., deployments displayed in the first window 805).

Figure 9:
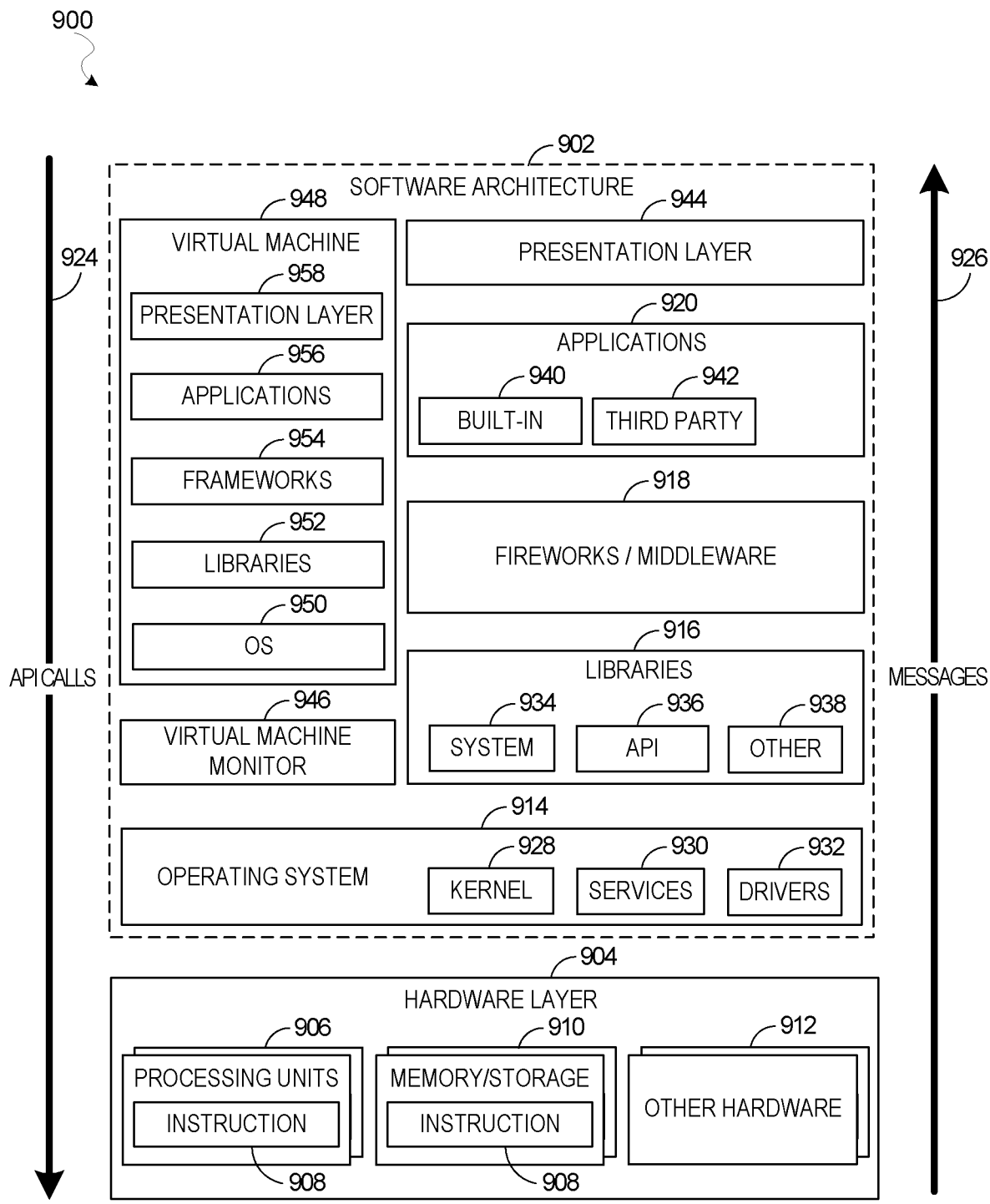
FIG. 9 is a block diagram illustrating a representative software architecture, which may be used in conjunction with various hardware architectures herein described.

FIG. 9 is a block diagram illustrating an example of a software architecture that may be installed on a machine, according to some example embodiments. FIG. 9 is merely a non-limiting example of a software architecture, and it will be appreciated that many other architectures may be implemented to facilitate the functionality described herein. The software architecture 902 may be executing on hardware such as a machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902, including implementation of the methods, modules, and so forth of FIGS. 2-8. The hardware layer 904 also includes memory or storage modules 910, which also have the executable instructions 908. The hardware layer 904 may also comprise other hardware 912, which represents any other hardware of the hardware layer 904, such as the other hardware illustrated as part of the machine 900.

In the example architecture of FIG. 9, the software architecture 902 may be conceptualized as a stack of layers, where each layer provides particular functionality. For example, the software architecture 902 may include layers such as an operating system 914, libraries 916, frameworks/middleware 918, applications 920, and a presentation layer 944. Operationally, the applications 920 or other components within the layers may invoke API calls 924 through the software stack and receive a response, returned values, and so forth (illustrated as messages 926) in response to the API calls 924. The layers illustrated are representative in nature, and not all software architectures have all layers. For example, some mobile or special purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than by interfacing directly with the underlying operating system 914 functionality (e.g., kernel 928, services 930, or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media formats such as MPEG4, H264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a home application, a contacts application, a browser application, a book reader application, a location application, a media application, a messaging application, or a game application.

The third-party applications 942 may include any of the built-in applications 940, as well as a broad assortment of other applications. In a specific example, the third-party applications 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 942 may invoke the API calls 924 provided by the mobile operating system such as the operating system 914 to facilitate functionality described herein.

The applications 920 may utilize built-in operating system functions (e.g., kernel 928, services 930, or drivers 932), libraries (e.g., system 934, APIs 936, and other libraries 938), or frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with the user.

Some software architectures utilize virtual machines. In the example of FIG. 9, this is illustrated by a virtual machine 948. A virtual machine creates a software environment where applications/modules can execute as if they were executing on a hardware machine e.g., the machine 1000 of FIG. 10, for example). A virtual machine 948 is hosted by a host operating system (e.g., operating system 914) and typically, although not always, has a virtual machine monitor 946, which manages the operation of the virtual machine 948 as well as the interface with the host operating system (e.g., operating system 914). A software architecture executes within the virtual machine 948, such as an operating system 950, libraries 952, frameworks/middleware 954, applications 956, or a presentation layer 958. These layers of software architecture executing within the virtual machine 948 can be the same as corresponding layers previously described or may be different.

Figure 10:
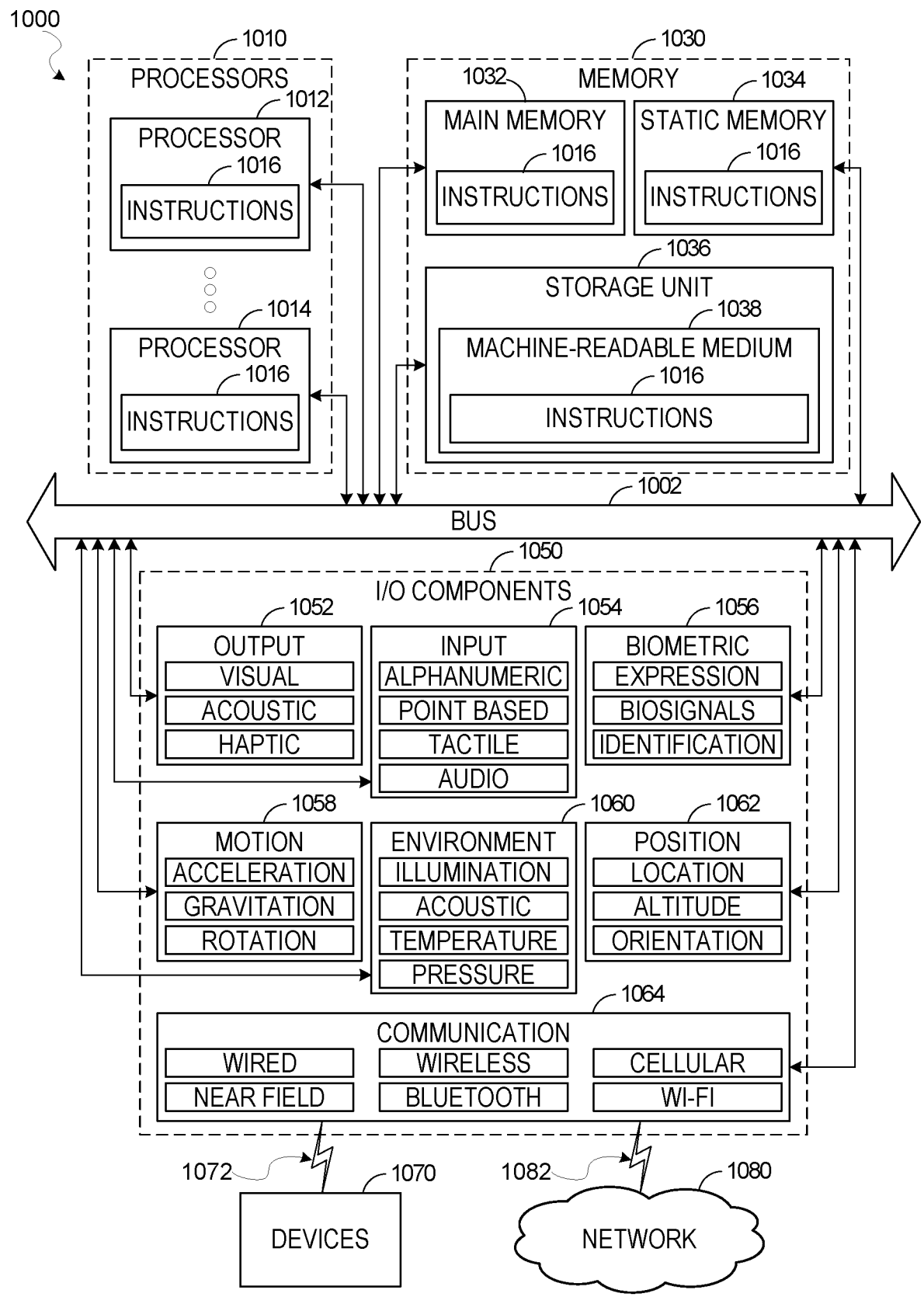
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions 1016 may cause the machine 1000 to execute the method XYZ of FIG. 10. Additionally, or alternatively, the instructions 1016 may implement FIGS. 2-8, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036, both accessible to the processors 1010 such as via the bus 1002. The main memory 1030, the static memory 1034, and storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or storage unit 1036 may store one or more sets of instructions and data structures (e.g., software) embodying or utilized by any one or more of the methodologies or functions described herein. These instructions (e.g., the instructions 1016), when executed by processor(s) 1010, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A method comprising:
   receiving, using one more processors of a machine, a request to initiate one or more containers to run on a container platform, the request identifying a machine learning scheme parameter file that specifies model data for a machine learning model, platform parameters, and job-specific configurations for the one or more containers;
   converting the machine learning scheme parameter file into a configuration file using a mapping template, the configuration file comprising the platform parameters and job-specific configurations native to the container platform;
   initiating the one or more containers on the container platform with the configuration file by translating the model data into platform parameters native to the container platform; and
   storing output data generated by the one or more containers.

2. The method of claim 1, wherein converting further comprises:
   using the mapping template to convert the machine learning scheme parameter file into the configuration file by mapping the platform parameters of the machine learning scheme parameter file into commands native to the container platform.

3. The method of claim 1,
   wherein the machine learning scheme parameter file includes a detailed mapping of computational resources to specific machine learning tasks within the one or more containers, and wherein the initiating includes allocating the computational resources to the containers in accordance with the detailed mapping.

4. The method of claim 1, wherein the machine learning scheme parameter file specifies a container image for the machine learning model, wherein the container platform is configured to manage the one or more containers.

5. The method of claim 4, wherein the initiation is dynamically configured based on the platform parameters and job-specific configurations derived from the machine learning scheme parameter file.

6. The method of claim 4, wherein the model data comprises a network address of code that is executable in the one or more containers using the container image, the network address of the code located on a network server.

7. The method of claim 4, wherein the model data comprises machine learning model configuration data that specifies a set of configuration parameters of the machine learning model, wherein the machine learning model configuration data specifies a plurality of container jobs.

8. The method of claim 7, wherein each container job comprises a differently configured set of configuration parameters of the machine learning model.

9. The method of claim 7, wherein the initiating the one or more containers comprises initiating a plurality of containers using the same machine learning container image.

10. The method of claim 4, wherein the model data comprises hardware resource parameter data specifying one or more processor units and memory units, wherein the hardware resource parameter data specifies hardware resources for each container job.

11. A system comprising:
    one or more processors of the system; and
    a memory storing instructions that, when executed by the one or more processors, cause the system to perform operations comprising:
    receiving, using the one more processors, a request to initiate one or more containers to run on a container platform, the request identifying a machine learning scheme parameter file that specifies model data for a machine learning model, platform parameters, and job-specific configurations for the one or more containers;
    converting the machine learning scheme parameter file into a configuration file using a mapping template, the configuration file comprising the platform parameters and job-specific configurations native to the container platform;
    initiating the one or more containers on the container platform with the configuration file by translating the model data into platform parameters native to the container platform; and
    storing output data generated by the one or more containers.

12. The system of claim 11, wherein converting further comprises:
    using the mapping template to convert the machine learning scheme parameter file into the configuration file.

13. The system of claim 11, wherein converting further comprises:
    mapping the platform parameters of the machine learning scheme parameter file into commands native to the container platform.

14. The system of claim 11, wherein the machine learning scheme parameter file specifies a container image for the machine learning model, wherein the container platform is configured to manage the one or more containers.

15. The system of claim 14, wherein the initiation is dynamically configured based on the platform parameters and job-specific configurations derived from the machine learning scheme parameter file.

16. The system of claim 14, wherein the model data comprises a network address of code that is executable in the one or more containers using the container image, the network address of the code located on a network server.

17. The system of claim 14, wherein the model data comprises machine learning model configuration data that specifies a set of configuration parameters of the machine learning model, wherein the machine learning model configuration data specifies a plurality of container jobs.

18. The system of claim 17, wherein each container job comprises a differently configured set of configuration parameters of the machine learning model.

19. The system of claim 17, wherein the initiating the one or more containers comprises initiating a plurality of containers using the same machine learning container image.

20. A non-transitory machine-readable storage device embodying instructions that, when executed by a device, cause the device to perform operations comprising:
- receiving, using one more processors of a machine, a request to initiate one or more containers to run on a container platform, the request identifying a machine learning scheme parameter file that specifies model data for a machine learning model, platform parameters, and job-specific configurations for the one or more containers;
- converting the machine learning scheme parameter file into a configuration file using a mapping template, the configuration file comprising the platform parameters and job-specific configurations native to the container platform;
- initiating the one or more containers on the container platform with the configuration file by translating the model data into platform parameters native to the container platform; and
- storing output data generated by the one or more containers, wherein the output data includes metrics indicative of the execution of the containers according to the job-specific configurations.

* * * * *